May 15, 1923.
A. JACOBSEN
PEA CLEANER
Filed Nov. 29, 1921
1,455,208
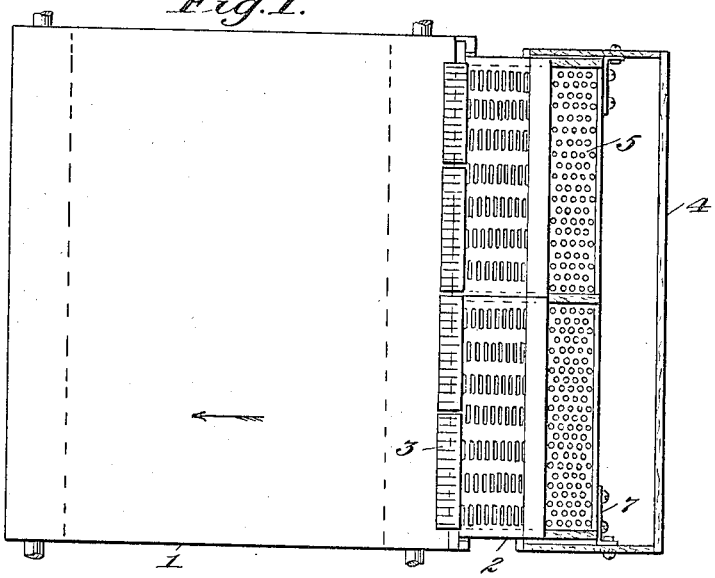
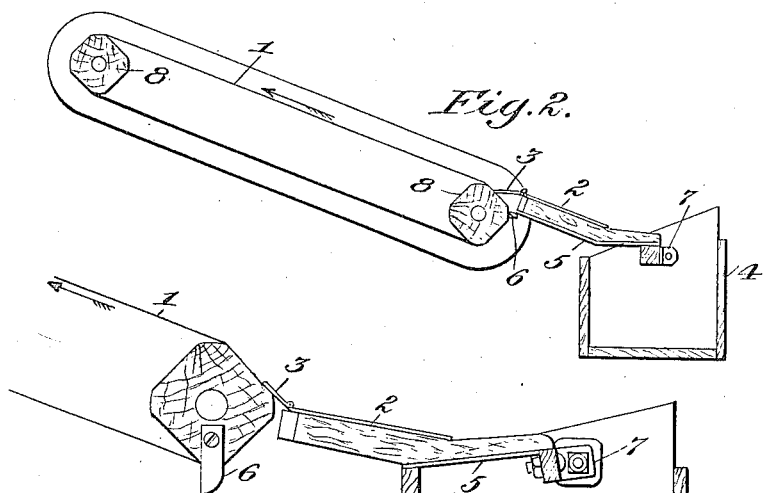
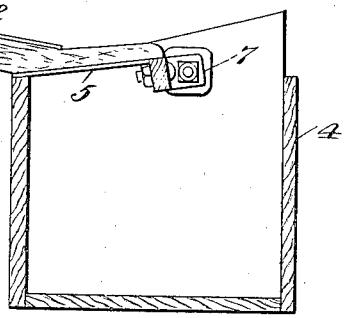
Inventor:
Andrew Jacobsen
Frank O. Parker
Att'y.

Patented May 15, 1923.

1,455,208

UNITED STATES PATENT OFFICE.

ANDREW JACOBSEN, OF GREEN BAY, WISCONSIN, ASSIGNOR TO WILLIAM LARSEN, OF GREEN BAY, WISCONSIN.

PEA CLEANER.

Application filed November 29, 1921. Serial No. 518,522.

*To all whom it may concern:*

Be it known that I, ANDREW JACOBSEN, a citizen of the United States, residing at Green Bay, in the county of Brown and State of Wisconsin, have invented certain new and useful Improvements in Pea Cleaners, of which the following is a specification.

The invention relates to a pea cleaner, and has for its primary object to provide a device, wherein the peas when delivered from a viner will be directed onto a screen, which will separate all dirt, straw split peas and foreign matter from the whole peas, and discharge the latter into a container, while the dirt, split peas, straw and other matter will be let off of the screen outside of the container.

Another object of the invention is the provision of a device of this character, wherein the screen for receiving the peas is of novel form and supported so that the same can be agitated for the thorough cleaning of the peas, to remove all dirt and foreign matter therefrom, before said peas are discharged into the container therefor, the manner of agitating the screen being also novel.

A further object of the invention is the provision of a device of this character, wherein the conveyor for the peas is disposed at an inclination, so that the peas will gravitate thereon onto the screen for the separation of the dirt from said peas, while the straw and stalks will be carried upwardly and discharged from the elevated point of the conveyor, thus it being seen that the straw, stalks, dirt, split peas and whole peas will be discharged at different points of the device for the complete separation of the same.

A still further object of the invention is the provision of a device of this character, which is extremely simple in construction, thoroughly reliable and efficient in operation, and inexpensive in manufacture and installation.

With these and other objects in view, the invention consists in the features of construction, combination and arrangement of parts, as will be hereinafter fully described, illustrated in the accompanying drawing and pointed out in the claims hereunto appended.

In the accompanying drawing:

Figure 1, is a top plan view of the device constructed in accordance with the invention.

Figure 2, is a fragmentary vertical sectional elevation.

Figure 3, is a view similar to Figure 2, on an enlarged scale.

Similar reference characters indicate corresponding parts throughout the several views in the drawing.

Referring to the drawing in detail, 1, designates generally the conveyor, which in this instance, is in the form of an endless belt, preferably made from canvas or fabric of any suitable material, the latter being trained over spaced parallel rollers 8, having their journals supported in any desirable way, so that one of the rollers 8, will be elevated relative to the other, whereby the conveyor will be inclined in one direction, as shown in Figures 2 and 3, of the drawing. These rollers 8, are preferably of squared formation in cross section, for a purpose as will be hereinafter described.

Located adjacent to the lowermost roller 8, supporting the conveyor 1, but spaced therefrom the desired distance is a container 4, in the form of a box open at its top through which peas are discharged after the cleaning thereof, the container being designed to receive the peas when cleaned.

Bridging the space between the conveyor 1, and the container 4, is a screen 2, preferably of the construction shown in Figure 1, of the drawing. The perforated portion 5, of this screen 2, extends over a distance of the open top of the container 4, and has fixed thereto at opposite corners brackets 7, which are pivoted to the end of the said container 4, so that the screen can be swung up and down in a manner presently described.

On the free longitudinal edge of the screen 2, next to the conveyor 1, is a series of hinged deflectors 3, which are adapted to ride upon the conveyor 1, during the travelling movement thereof in the direction of the arrows shown in Figures 1, 2 and 3, of the drawing.

Mounted on the ends of the lowermost roller 8, are trips 6, which are adapted to engage with the free longitudinal edge of the screen 2, so as to intermittently agitate the same when the conveyor is operating, to displace the peas when delivered onto the screen from the said conveyor and thus cause the dirt and other foreign matter to be sifted through said screen to the outside of the container, while the whole peas will pass onto the portion 5, of the screen and discharge into the container 4. The screen 2, normally rests upon the side wall of the container 4, that is to say, the wall beneath said screen, as shown in Figure 3, of the drawing.

When the conveyor 1, is operating the trips 6, on contact with the screen 2, will lift it upwardly as shown in Figure 2, until the said trips have passed the screen when the same will again drop or become lowered to the position shown in Figure 3, of the drawing, and in this manner the said screen will be intermittently agitated for the separation of the peas and dirt thereon to assure the discharge of the peas into the container 4, and the dirt outside of the same.

The cross-sectional squared formation of the rollers 8, serves to keep the belt 1, taut and the lowermost roller active upon the deflectors 3, to direct the peas from the conveyor 1 onto the screen 2, as the said peas and dirt gravitate on said conveyor. The vine, straw or stalk which are delivered from the viner with the peas are carried upwardly of said conveyor when dropped thereon, so that the said vines, straw and stalks are discharged from the elevated end of the conveyor. Split peas passed upon the screen 2, will discharge therethrough with the dirt outside of the container 4, thus it being seen that the vines, straw or stalks will be discharged at one point, the dirt and split peas at another point and the whole peas at another point of the device, when the same is in operation.

From the foregoing it is thought that the construction and manner of operation of the device will be clearly understood, and therefore a more extended explanation has been omitted. However, changes, variations and modifications may be made in the device without departing from the spirit of the invention or sacrificing any of its advantages, as fall properly within the scope of the claims hereunto appended.

What is claimed is:

1. The combination with a container having an open top, of a screen extended over a portion of the open top of the container and swingingly connected to the ends thereof, an inclined conveyor adjacent to the container, and means operative with the conveyor for tripping the screen to agitate the same.

2. The combination with a container having an open top, of a screen pivotally connected with the ends of the container and extending over a portion of the open top of the same to normally rest upon one side wall of said container, a conveyor in close proximity to the screen and inclined in the direction of the same, means operative with the conveyor for tripping the screen to agitate the same, and deflector plates hinged to the screen and bridging the space between the latter and the conveyor.

3. The combination with a container having an open top, of a screen pivotally connected with the ends of the container and extending over a portion of the open top thereof to normally rest upon one side wall of said container, a conveyor in close proximity to the screen and inclined in the direction of the same, means operative with the conveyor for tripping the screen to agitate the same, and deflector plates hinged to the screen at its edge adjacent to the conveyor and bridging the space between it and the screen, the plates being in contact with said conveyor.

In testimony whereof I have affixed my hand this 29th day of Oct. 1921.

ANDREW JACOBSEN.